(12) United States Patent
Takahashi (10) Patent No.: US 11,108,929 B2
(45) Date of Patent: Aug. 31, 2021

(54) SHEET CONVEYING DEVICE AND DOCUMENT READING UNIT (71) Applicant: TOSHIBA TEC KABUSHIKI KAISHA, Tokyo (JP)

(72) Inventor: Kazutoshi Takahashi, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/003,867

(22) Filed: Aug. 26, 2020

(65) Prior Publication Data

US 2021/0195052 A1 Jun. 24, 2021

(30) Foreign Application Priority Data

Dec. 19, 2019 (JP) .............................. JP2019-229586

(51) Int. Cl.
*H04N 1/12* (2006.01)
*B65H 5/36* (2006.01)
*B65H 5/06* (2006.01)
*H04N 1/00* (2006.01)

(52) U.S. Cl.
CPC ........... *H04N 1/1215* (2013.01); *B65H 5/068* (2013.01); *B65H 5/36* (2013.01); *H04N 1/00798* (2013.01); *H04N 1/123* (2013.01); *H04N 1/125* (2013.01); *H04N 2201/0081* (2013.01)

(58) Field of Classification Search
CPC ........... H04N 1/00013; H04N 1/00018; H04N 1/00092; H04N 1/00519–00679; H04N 1/00681–00761; H04N 1/00785–00827; H04N 1/00835; H04N 1/00909; H04N 1/024–0318; H04N 1/04–207; H04N 2201/024–04798; H04N 1/00–00005; H04N 1/00021–00047; H04N 1/00058–0009; H04N 1/27–31; H04N 1/32144–32352; H04N 1/38–419; H04N 1/46–648; H04N 2201/00–0006; H04N 2201/3269–3271; H04N 2201/33378; H04N 1/1215; H04N 1/123; H04N 1/125; H04N 1/00798; H04N 2201/0081; G06K 15/025–027; G06K 15/129; G06K 15/1825; G06K 15/1826; G06K 15/1835–1847; G06K 15/1848–1855; G06K 15/1867–1881; G06K 15/1889–1898; G06K 2215/004–008;
(Continued)

(56) References Cited

U.S. PATENT DOCUMENTS

8,740,215 B2 6/2014 Watanabe et al.
8,849,178 B2 * 9/2014 Yoshimura ......... G03G 15/6558
399/388
10,703,594 B2 * 7/2020 Furusawa ............ B65H 3/5261
(Continued)

*Primary Examiner* — Negussie Worku
(74) *Attorney, Agent, or Firm* — Kim & Stewart LLP (57) ABSTRACT

According to one or more embodiments, a sheet conveying device includes a reading device, a roller, a downstream guide, and a transition guide. The reading device reads a surface of the sheet. The roller faces the reading device. The downstream guide is downstream of the roller in the sheet conveyance direction. The transition guide guides the sheet at least during a sheet transition from the reading position to s an upstream end of the downstream guide.

20 Claims, 10 Drawing Sheets

(58) Field of Classification Search
CPC ... G06K 2215/0094; B65H 5/068; B65H 5/36
USPC ........................................ 358/498, 497, 496
See application file for complete search history.

(56) References Cited

U.S. PATENT DOCUMENTS

| | | | | |
|---|---|---|---|---|
| 2002/0069775 | A1* | 6/2002 | Knopp | B41F 25/00 |
| | | | | 101/232 |
| 2007/0057444 | A1* | 3/2007 | Sagawa | B65H 5/025 |
| | | | | 271/225 |
| 2009/0086287 | A1* | 4/2009 | Won | H04N 1/00594 |
| | | | | 358/498 |
| 2009/0102117 | A1* | 4/2009 | Yu | B65H 9/006 |
| | | | | 271/226 |
| 2012/0080838 | A1* | 4/2012 | Osada | B65H 5/062 |
| | | | | 271/228 |
| 2012/0091652 | A1* | 4/2012 | Suzuki | B65H 7/02 |
| | | | | 271/110 |
| 2012/0093554 | A1* | 4/2012 | Suzuki | B65H 7/02 |
| | | | | 399/381 |
| 2013/0049290 | A1* | 2/2013 | Matsumoto | B65H 31/34 |
| | | | | 271/145 |
| 2013/0214480 | A1* | 8/2013 | Watanabe | B65H 9/06 |
| | | | | 271/226 |
| 2021/0039902 | A1* | 2/2021 | Takahashi | G03G 15/757 |

* cited by examiner

SHEET CONVEYING DEVICE AND DOCUMENT READING UNIT

CROSS-REFERENCE TO RELATED APPLICATIONS

This application is based upon and claims the benefit of priority from Japanese Patent Application No. 2019-229586, filed on Dec. 19, 2019, the entire contents of which are incorporated herein by reference.

FIELD

Embodiments described herein relate generally to a sheet conveying device and a document reading unit.

BACKGROUND

As image forming apparatus that forms an image on a sheet is known. Such an image forming apparatus includes a document reading unit such as a Dual Scan Document Feeder (DSDF). A DSDF simultaneously reads both sides (front and back surfaces) of a sheet during sheet conveyance in one direction (one pass scanning of both sides of the sheet). The DSDF includes a sheet conveying device that conveys a sheet in one direction. The sheet conveying device includes a reading device (or a reader), a roller, and a downstream guide. The reading device reads one side of the sheet being conveyed. The roller faces the reading device. The downstream guide is disposed downstream of the roller along the sheet conveyance direction. In order to prevent an occurrence of abnormal noise due to rubbing between the roller and the downstream guide, a gap is left between the roller and the downstream guide. Because of the gap left between the roller and the downstream guide, when a sheet is conveyed, the leading end of the sheet (that is the downstream end in the sheet conveyance direction) may be caught by the downstream guide. When the leading end of the sheet is caught by the downstream guide, there is a possibility that a corner folding of the sheet, a jam of the sheet, or the like might occur.

Hence, there is a need for a sheet conveying device capable of suppressing catching of a sheet, such as sheet jam, during sheet conveyance in an image processing apparatus or an image forming apparatus, and there is also a need for a document reading unit comprising such a sheet conveying device.

DETAILED DESCRIPTION

According to one or more embodiments, a sheet conveying device comprises a reading device configured to read an image on a sheet at a reading position, a roller facing the reading device, and a downstream guide that is downstream of the roller along a sheet conveyance direction. A gap is between an upstream end of the downstream guide and the roller. A transition guide is provided to block the gap and guide a leading edge of the sheet in the sheet conveyance direction on to the downstream guide during a sheet transition from the roller to downstream guide.

Hereinafter, a sheet conveying device and a document reading unit according to one or more example embodiments will be described with reference to the drawings.

Figure 1:
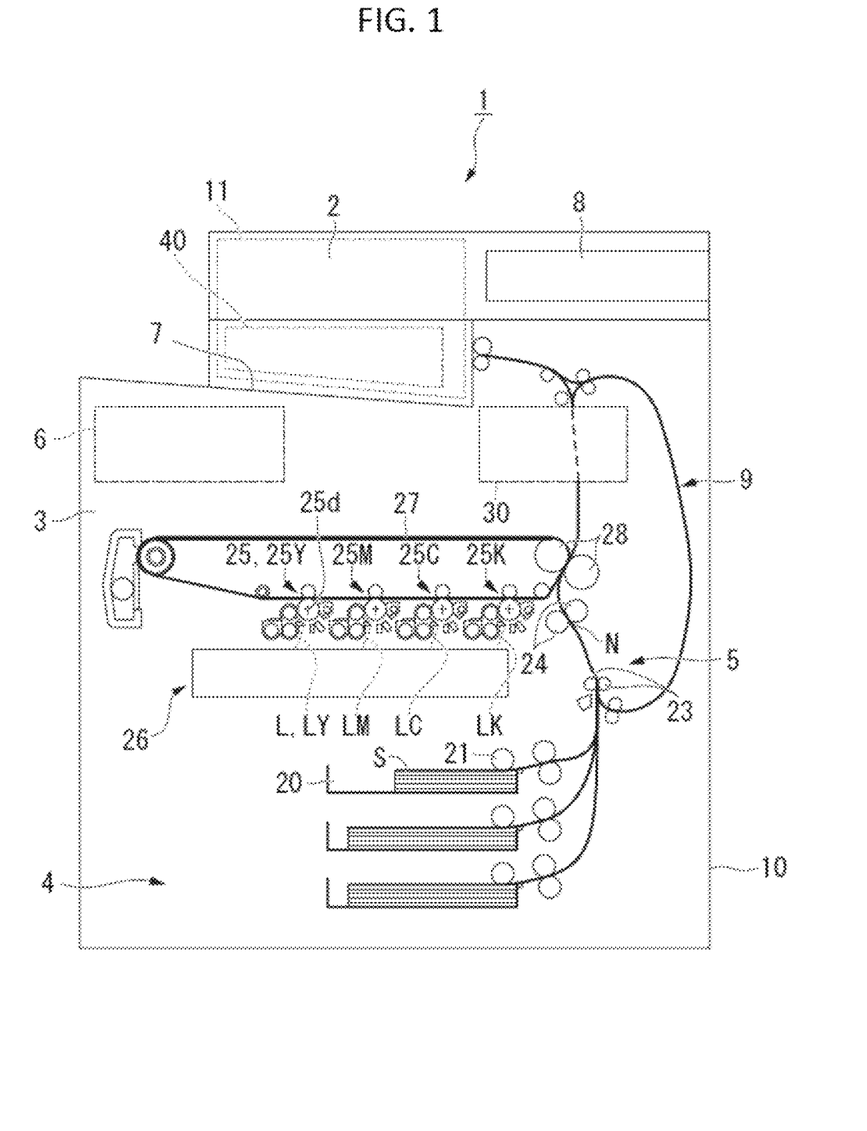
FIG. 1 depicts an image processing apparatus according to an embodiment.

FIG. 1 is a schematic configuration diagram of an image processing apparatus according to an embodiment.

The image processing apparatus according to the present embodiment is an image forming apparatus 1. The image forming apparatus 1 is configured to perform a process of forming an image on a sheet S, which may be paper or other media.

The image forming apparatus 1 includes a housing 10, a scanner unit 2, an image forming unit 3, a sheet supply unit 4, a conveyance unit 5, a sheet discharge tray 7, an inversion unit 9, a control panel 8, a document reading unit 11, and a controller 6.

The housing 10 forms an outer casing of the image forming apparatus 1.

The scanner unit 2 reads image information of a copy target as brightness and darkness of reflected light from a document or the like and generates an image signal. The scanner unit 2 outputs the generated image signal to the image forming unit 3.

The image forming unit 3 forms an output image (hereinafter referred to as a toner image) using a recording agent, such as toner, based on an image signal received from the scanner unit 2 or an image signal received from an external device. The image forming unit 3 transfers the toner image onto the surface of the sheet S. The image forming unit 3 heats and presses the toner image on the surface of the sheet S and thus fixes the toner image to the sheet S.

The sheet supply unit 4 supplies the sheets S one by one to the conveyance unit 5 in accordance with a timing at which the image forming unit 3 forms the toner image. The sheet supply unit 4 includes one or more sheet storage units 20 (may also be referred to as sheet accommodation portions) and one or more pickup rollers 21.

The sheet storage units 20 each store a plurality of sheets S of predetermined sizes and types.

The pickup rollers 21 pick up the sheets S one by one from the respective sheet storage units 20. Each pickup roller 21 supplies the picked-up sheet S to the conveyance unit 5.

The conveyance unit 5 conveys the sheet S from the sheet supply unit 4 to the image forming unit 3. The conveyance unit 5 includes one or more conveyance rollers 23 and one or more registration rollers 24.

The conveyance rollers 23 receive the sheet S from the pickup rollers 21 and convey it to the registration roller(s) 24. The conveyance rollers 23 make a leading end of the sheet S in the conveyance direction abut against a nip N of the registration rollers 24.

The registration rollers 24 can hold the sheet S at the entrance to the nip N, thereby adjusting a position of the leading end of the sheet S along the conveyance direction. The registration rollers 24 then convey the sheet S in accordance with the timing at the image forming unit 3 can appropriately transfer the toner image to the sheet S.

The image forming unit 3 includes a plurality of image forming devices 25, a laser scanning unit 26, an intermediate transfer belt 27, a transfer unit 28, and a fixing device 30.

The image forming devices 25 include a photosensitive drum 25d. The image forming devices 25 form a toner image corresponding to an image signal from the scanner unit 2 or an image signal from an external device on the photosensitive drum 25d. The plurality of image forming devices 25Y, 25M, 25C, and 25K form toner images of yellow, magenta, cyan, and black toner, respectively.

An electrostatic charger, a developing device, and the like are disposed around the photosensitive drum 25d. The electrostatic charger charges a surface of the photosensitive drum 25d. The developing device contains a developer containing, for example, yellow, magenta, cyan, or black toner. The developing device supplies developer/toner that develops an electrostatic latent image that has been formed on the photosensitive drum 25d. As a result, different toner images of the respective toner colors (or types) are formed on a photosensitive drum 25d.

The laser scanning unit 26 scans the charged photosensitive drum 25d with the laser beam L to selectively expose the photosensitive drum 25d to light. The laser scanning unit 26 exposes the photosensitive drums 25d of the image forming devices 25Y, 25M, 25C, and 25K with different laser beams LY, LM, LC, LK, and LK. Accordingly, the laser scanning unit 26 forms an electrostatic latent image on each respective photosensitive drum 25d.

The toner image on the surface of the photosensitive drum 25d is first transferred to the intermediate transfer belt 27. This first transfer (primary transfer) is to the intermediate transfer belt 12.

The transfer unit 28 then transfers the toner image from the intermediate transfer belt 27 to the sheet S at a second transfer position (secondary transfer).

The fixing device 30 heats and presses the toner image, which has been transferred to the sheet S, to fix the toner image to the sheet S.

The inversion unit 9 (also referred to as a reversing unit) reverses the sheet S to permit operations to form an image on a back surface of the sheet S. The inversion unit 9 reverses the sheets S discharged from the fixing device 30 by switchback or the like. The inversion unit 9 then conveys a reversed sheet S toward the registration roller 24.

The sheet discharge tray 7 receives the sheets S on which an image has been fixed/formed after discharge from the fixing device 30.

The control panel 8 permits inputting of information by an operator or a user to operate the image forming apparatus 1. The control panel 8 includes a touch panel and various kinds of hard keys. The control panel 8 may be referred to as an input unit.

The document reading unit 11 simultaneously reads both surfaces (the front surface and the back surface) of the sheet S while the sheet S is being conveyed in one direction. This simultaneous reading of both sides of a sheet may be referred to as a one-pass reading or scanning process. The document reading unit 11 in this example is a double-sided simultaneous document feeding (DSDF) device. The document reading unit 11 includes a sheet conveying device 40 that conveys the sheet S in one direction.

The controller 6 controls the respective components of the image forming apparatus 1.

Figure 2:
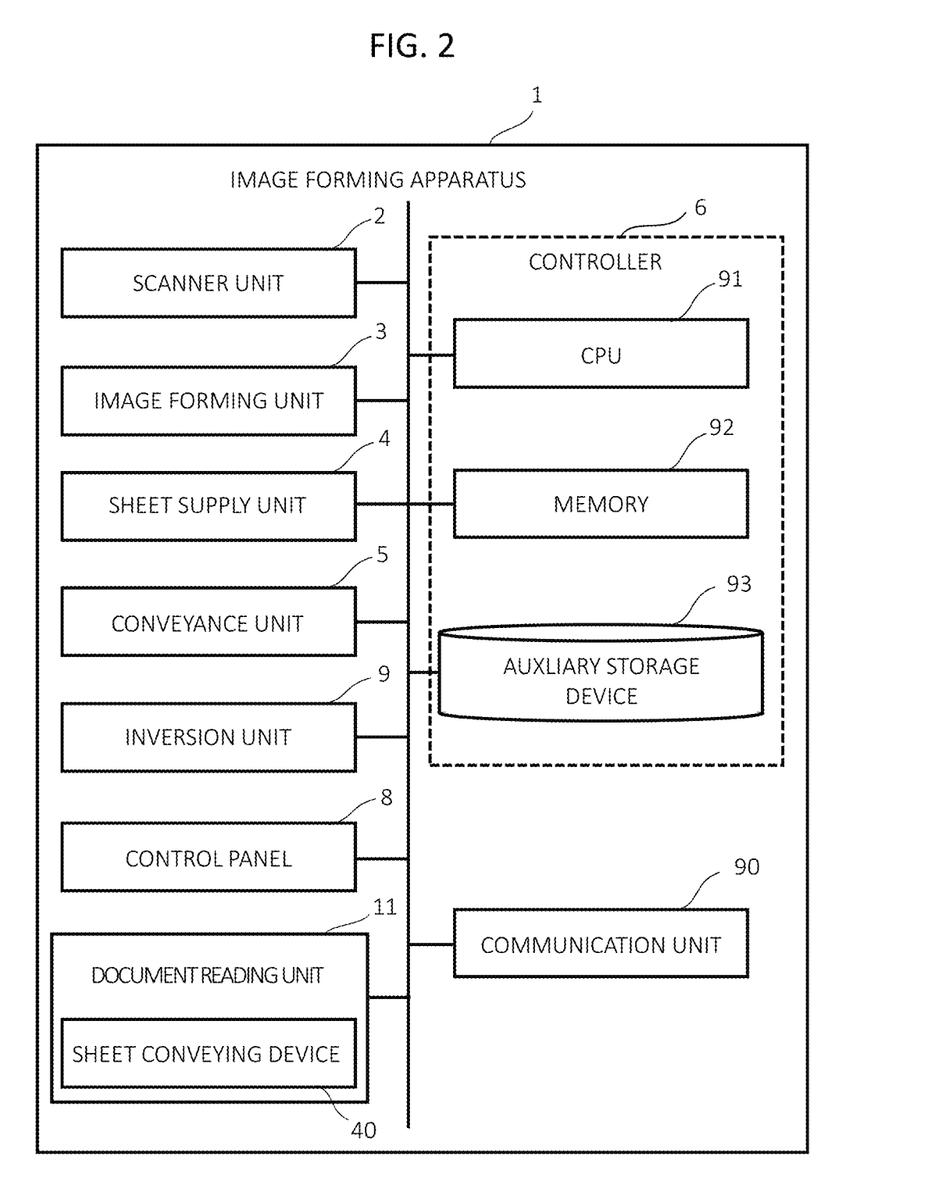
FIG. 2 depicts a configuration of an image processing apparatus according to an embodiment.

FIG. 2 is a block diagram of the image forming apparatus 1 to the present embodiment. The image forming apparatus 1 includes a central processing unit (CPU) 91, a memory 92, an auxiliary storage device 93, and the like connected by a bus. The CPU 91 executes a program (or programs) by which the various functional aspects of the image forming apparatus 1 are provided. For example, by execution of the program(s), functions of a scanner unit 2, an image forming unit 3, a sheet supply unit 4, a conveyance unit 5, an inversion unit 9, a control panel 8, a document reading unit 11, and a communication unit 90 are provided.

The CPU 91 also functions as the controller 6 by executing a program stored in the memory 92 and/or the auxiliary storage device 93. The controller 6 controls the operation of the respective functional units of the image forming apparatus 1, which, as described, include the scanner unit 2, the image forming unit 3, the sheet supply unit 4, the conveyance unit 5, the inversion unit 9, the control panel 8, and the document reading unit 11 as well as a communication unit 90.

The auxiliary storage device 93 may be a storage device such as a magnetic hard disk device or a semiconductor storage device. The auxiliary storage device 93 may store information, programs, data and the like.

The communication unit 90 includes a communication interface for connection to an external device or apparatus. The communication unit 90 communicates with the external device via the communication interface.

Figure 3:
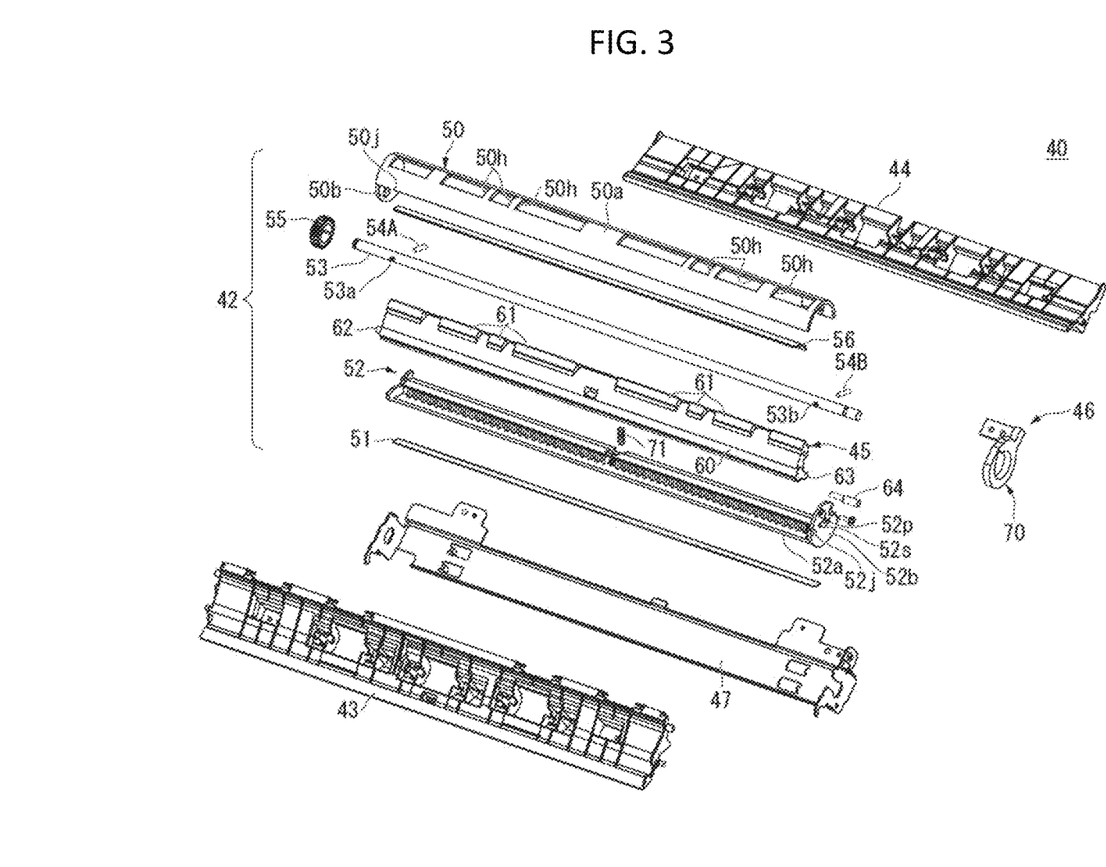
FIG. 3 depicts a sheet conveying device in an exploded perspective view according to an embodiment.
Figure 4:
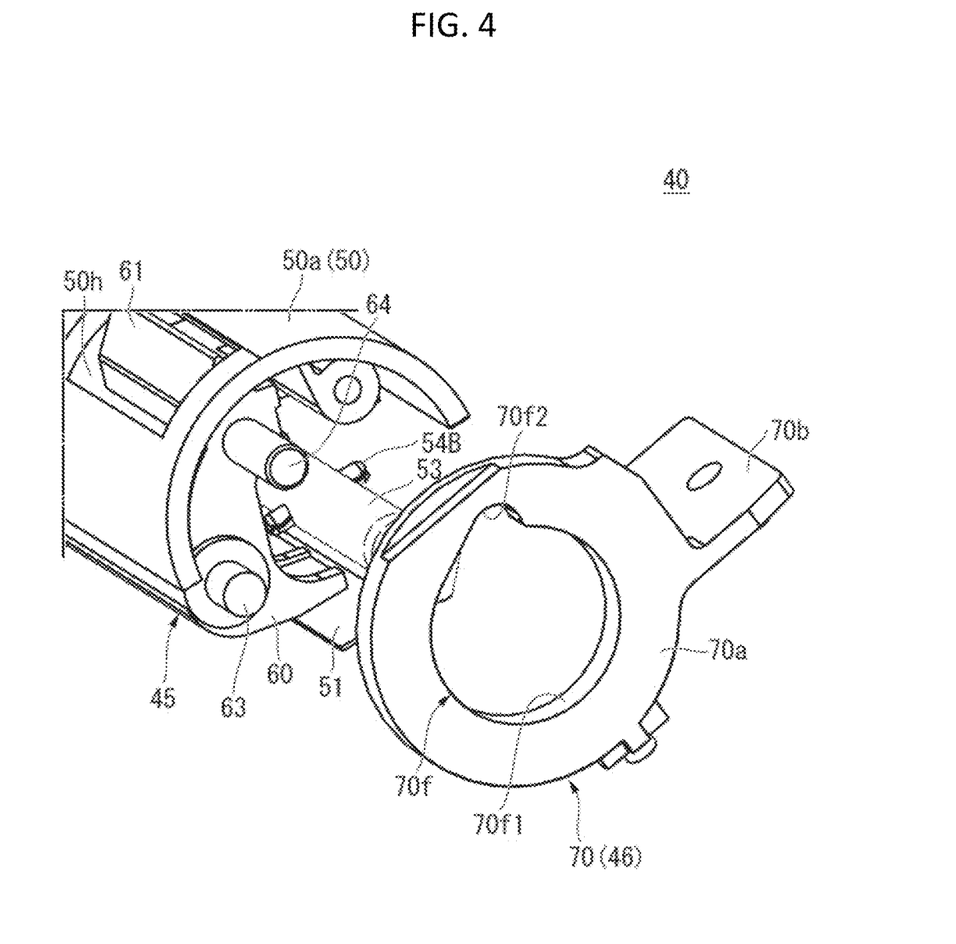
FIG. 4 depicts a sheet conveying device in a partially enlarged perspective view according to an embodiment.
Figure 5:
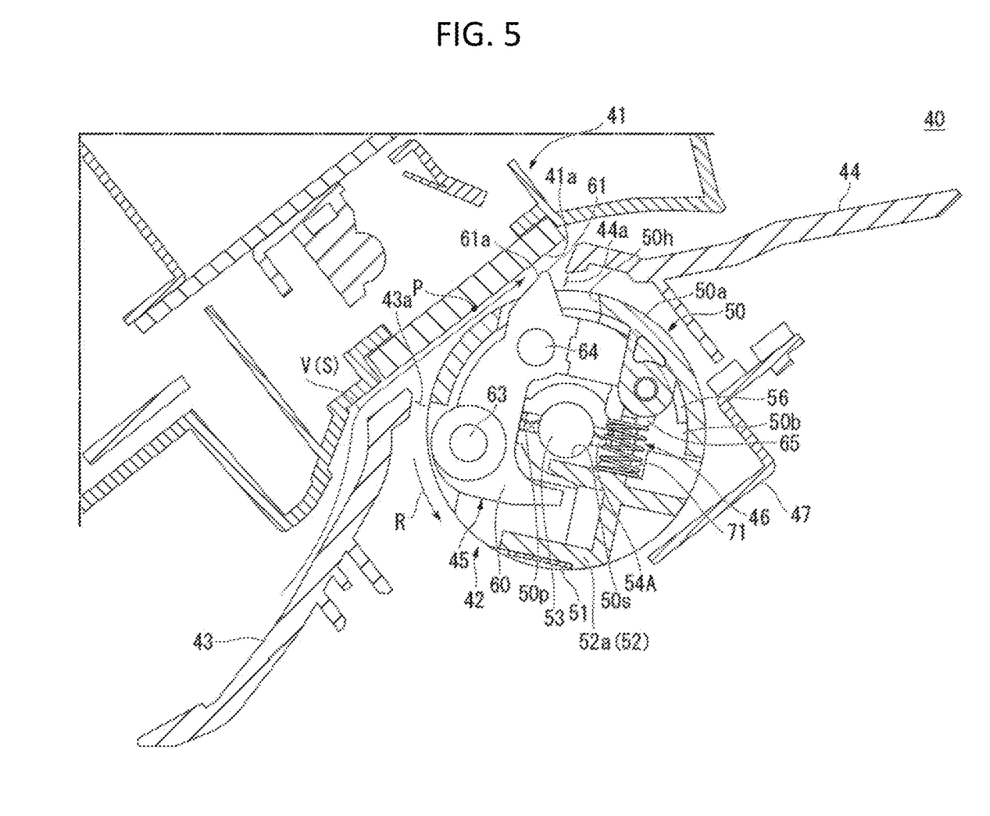
FIG. 5 depicts an internal structure of a sheet conveying device in a cross-sectional view according to an embodiment.

FIGS. 3 and 4 are an exploded perspective view and a partially enlarged perspective view of the sheet conveying device 40 according to the present embodiment, respectively. FIG. 5 is a cross-sectional view for describing an internal structure of the sheet conveying device 40 according to the present embodiment.

As shown in FIG. 5, the sheet conveying device 40 includes a reading device 41, a roller 42, an upstream guide 43, a downstream guide 44, a movable guide 45, and a drive mechanism 46. For example, the sheet S is conveyed in a direction indicated by an arrow V in the drawing between the reading device 41 and the roller 42 by a conveyance roller or a conveyance unit. Hereinafter, a direction in which the sheet S is conveyed as shown by arrow V will be referred to as a "sheet conveyance direction V."

The reading device 41 reads one surface/side of the sheet S. For example, the reading device 41 is an optical system for reading a back surface of the sheet S. For example, the reading device 41 includes a charge-coupled device (referred to as a "CCD"), a lens, a mirror, an LED (as a light source), and the like. For example, the reading device 41 includes a plurality of CCDs. The reading device 41 is disposed above the roller 42. The reading device 41 has a flat reading surface 41a facing the roller 42. As viewed from the axial direction of the roller 42, the reading surface 41a is inclined in a straight-line shape so as to be positioned on the upper side toward the downstream side in the sheet conveyance direction V.

The roller 42 is opposed to the reading device 41. The roller 42 is disposed below the reading device 41. The roller 42 has a cylindrical shape. Hereinafter, the axial direction of the roller 42 is referred to as an "axial direction," the direction orthogonal to the axial direction is referred to as a "radial direction," and the rotational direction of the roller 42 is referred to as a "circumferential direction." The roller 42 is rotatable in the counterclockwise direction as viewed from the axial direction (as shown by arrow R). For example, the roller 42 includes a one-way clutch that allows rotation in just one direction (that is the counterclockwise direction in the figure). The roller 42 may also be allowed to rotate in the other direction (that is the clockwise direction in the figure).

As shown in FIG. 3, the roller 42 is an assembly of a plurality of components. The roller 42 includes a guide plate 50, a white correction plate 51, a frame 52, a shaft 53, first transmission pin 54A, second transmission pin 54B, a gear 55, and a cushion 56. The roller 42 also serves as a white reference plate for determining a white reference level during the reading of a surface of the sheet S.

The guide plate 50 is used during conveyance of the sheet S. The guide plate 50 includes a guide body 50a and a guide side plate 50b. The guide body 50a extends in the axial direction. The guide body 50a is formed in an arc shape when viewed from the axial direction. As shown in FIG. 5, the guide body 50a faces the reading surface 41a when the sheet S is being conveyed. In this case, the guide body 50a guides the sheet S conveyed from the upstream side to the downstream side along the sheet conveyance direction V. For example, the guide body 50a is formed of a white member. This makes it possible to minimize the influence of shade/shadows when thin paper is passed.

The guide body 50a has a plurality of through-holes 50h that are open in the radial direction. The plurality of through-holes 50h are disposed at intervals in the axial direction of the guide body 50a (see FIG. 3). Each through-hole 50h is formed to have a size that allows a distal end of a corresponding transition guide 61 to protrude therein. By providing the plurality of through-holes 50h, the rigidity of the guide body 50a can be improved as compared with a case where only a single through-hole 50h is provided in the axial direction.

The guide side plate 50b is connected to one end of the guide body 50a in the axial direction. The guide side plate 50b has a disc shape. One end in the axial direction of the shaft 53 is inserted into the guide side plate 50b. The guide side plate 50b supports the first support shaft 62 of the movable guide 45 and the first transmission pin 54A. The guide side plate 50b has a first support hole 50j, a first insertion hole 50s, and a first pin hole 50p that are open in the axial direction. The first support hole 50j is a hole in which the first support shaft 62 of the movable guide 45 is supported (see FIG. 3). The first insertion hole 50s is a hole through which one end in the axial direction of the shaft 53 is inserted. The first pin hole 50p is a hole in which the first transmission pin 54A is supported.

The white correction plate 51 has a rectangular plate shape with a longitudinal length in the axial direction. The white correction plate 51 is a white sheet for performing white correction when reading a document at a DSDF. The white correction plate 51 faces the reading surface 41a during white correction. For example, when reading a document in a DSDF, the reading device 41 captures an image of the white correction plate 51 in order to determine a white reference level for the CCD. Thereby, the white level of the CCD can be adjusted. The white correction plate 51 also functions as a white reference plate for determining a white reference level when reading a single surface of the sheet S.

The frame 52 is a component that serves as a framework supporting the roller 42. As shown in FIG. 3, the frame 52 includes a frame body 52a and a frame side plate 52b. The frame body 52a extends in the axial direction. The frame body 52a supports the white correction plate 51. For example, the white correction plate 51 is fixed to the radially outer surface of the frame body 52a by a double-sided tape or the like.

The frame side plate 52b is connected to one end of the frame body 52a in the axial direction. The frame side plate 52b has a disk shape. The frame side plate 52b faces the guide side plate 50b in the axial direction with the movable guide 45 interposed therebetween. The other end of the shaft 53 is inserted through the frame side plate 52b. The frame side plate 52b supports the second support shaft 63 and the second transmission pin 54B of the movable guide 45. The frame side plate 52b has a second support hole 52j, a second insertion hole 52s, and a second pin hole 52p that are open in the axial direction. The second support hole 52j is a hole through which the second support shaft 63 of the movable guide 45 is supported. The second insertion hole 52s is a hole through which one end of the shaft 53 is inserted. The second pin hole 52p is a hole in which the second transmission pin 54B is supported.

The shaft 53 has a rod-like shape extending in the axial direction. The shaft 53 provides an axis for rotating the roller 42. The shaft 53 has a plurality of locking holes 53a and 53b that are open in the radial direction. The locking holes 53a and 53b are provided at the ends of the shaft 53. The locking holes 53a are at one end of the shaft 53 in the axial direction and the locking holes 53b are provided at the other end of the shaft 53 in the axial direction.

The transmission pins 54A and 54B are members that transmit the rotational force of the shaft 53. The transmission pins 54A and 54B has a columnar shape extending in the radial direction. A multiple transmission pins 54A and 54B can be provided at intervals in the axial direction. A first transmission pin 54A is engaged by the first locking hole 53a. A second transmission pin 54B is engaged by the second locking hole 53b. For example, each of the first transmission pin 54A and the second transmission pin 54B is a spring pin.

The gear 55 is connected to one end of the shaft 53 in the axial direction. The gear 55 is a component for transmitting drive from a drive source (not separately depicted) such as a motor to the roller 42. When the gear 55 rotates due to the driving of the motor, the shaft 53 rotates integrally with the gear 55.

One end of the shaft 53 in the axial direction is supported by the guide side plate 50b via the first transmission pin 54A. The other end of the shaft 53 is supported by the frame side plate 52b via the second transmission pin 54B. Accordingly, the rotational force of the shaft 53 is transmitted to the guide plate 50 and the frame 52 via the transmission pins 54A and 54B. The guide plate 50 and the frame 52 rotate integrally with the shaft 53.

As shown in FIG. 5, the cushion 56 is disposed inside the roller 42. The cushion 56 extends in the axial direction. For example, the cushion 56 is formed as a layer of a cushioning material such as rubber. For example, the cushion 56 is fixed to the inner surface of the guide body 50a in the radial direction by a double-sided tape or the like. When viewed from the axial direction, the cushion 56 has an arc shape along the guide body 50a. The cushion 56 mitigates forces of impact during the operation of the movable guide 45.

The roller 42 may include an edge detection plate for detecting an edge of a small sheet such as a business card. For example, the edge detection plate is formed of a black member. Accordingly, when a business card, a small-sized piece of cardboard or the like passes the roller 42, an edge thereof can be detected with high accuracy.

The upstream guide 43 is disposed upstream of the roller 42 in the sheet conveyance direction V. The upstream guide 43 is inclined so as to approach the reading surface 41a toward the downstream side in the sheet conveyance direction V as viewed from the axial direction. A gap 43a is between the downstream end of the upstream guide 43 and the roller 42. By leaving the gap 43a between upstream guide 43 and the roller 42 it is possible to prevent abnormal noises that might otherwise be caused by rubbing between the roller 42 and the upstream guide 43 when the roller 42 rotates.

The upstream guide 43 is configured to guide the sheets S toward a facing position P, also referred to as a reading position P or a scanning position P. At the facing position P, the reading surface 41a of the reading device 41 and the outer peripheral surface of the roller 42 face each other. At the facing position P, the reading surface 41a of the reading device 41 and the outer peripheral surface of the roller 42 are closest in position to each other. At the reading position P, one surface of the sheet S is read/scanned.

The downstream guide 44 is disposed downstream of the roller 42 in the sheet conveyance direction V. When viewed from the axial direction, the downstream guide 44 is inclined away from the reading surface 41a toward the downstream side. The downstream guide 44 guides the sheet S after it has passed the facing position P in the sheet conveyance direction V. A gap 44a is left between the upstream end of the downstream guide 44 and the roller 42. By leaving the gap 44a, it is possible to prevent abnormal noise that might otherwise be caused due to rubbing between the roller 42 and the downstream guide 44 when the roller 42 rotates.

The movable guide 45 guides the sheet S downstream in the sheet conveyance direction V at least during a sheet transition time. The sheet transition time is the period from when the downstream end of the sheet S (leading edge of the sheet S) passes the reading position P until the downstream end of the sheet S crosses the upstream end of the downstream guide 44. The movable guide 45 includes a movable body 60, a transition guide 61, a first support shaft 62 (see FIG. 3), a second support shaft 63, a movable pin 64, and an urging receiving portion 65. For example, the movable body 60, the transition guide 61, the first support shaft 62, the second support shaft 63, and the urging receiving portion 65 are integrally formed as single component/member.

The movable body 60 extends in the axial direction. The movable body 60 has a U-shape (or a curved shape) that opens towards the shaft 53 when viewed from the axial direction. The movable body 60 is disposed inside the roller 42. The movable body 60 is disposed between the guide plate 50 and the frame 52. The movable body 60 is disposed between the guide plate 50 and the shaft 53. The movable body 60 rotates in the counterclockwise direction (as shown by arrow R in the figure) in accordance with a rotation of the roller 42.

The transition guide 61 protrudes outward in the radial direction of the movable body 60. The transition guide 61 has a triangular shape with an apex at a radially outer end. The transition guide 61 protrudes outward from the through-hole 50h of the guide body 50a during the sheet S conveyance past the gap 44a (that is, at least during the sheet transition time). During sheet S conveyance, the transition guide 61 protrudes so as to block the gap 44a. During sheet conveyance, the apex of the transition guide 61 is disposed higher than the gap 44a.

The transition guide 61 has a guide surface 61a that can contact and guide the sheet S during sheet conveyance. As viewed from the axial direction, the guide surface 61a is linearly inclined toward the reading surface 41a.

As shown in FIG. 3, a plurality of transition guides 61 can be provided along the axial direction of the movable body 60. The plurality of transition guides 61 are spaced apart from each other in the axial direction. In the example of FIG. 3, eight separate transition guides 61 are arranged on the upper portion of the movable body 60. The transition guides 61 can be disposed at positions corresponding to different sheet sizes. The transition guides 61 are disposed at positions corresponding to at least both outer edges of a sheet S in a width direction (that is a direction orthogonal to the sheet conveyance direction V and parallel to the axial direction). For example, for conveyance of an A4-size sheet, at least two of the transition guides 61 are disposed at positions that corresponds to the two outer edges of an A4-size sheet in the sheet width direction.

The first support shaft 62 and the second support shaft 63 are axes that serve as a pivot center (fulcrum) of the movable guide 45. The first support shaft 62 and the second support shaft 63 are disposed coaxially with each other.

The first support shaft 62 protrudes outward in the axial direction from one end of the movable body 60. The first support shaft 62 is supported by the first support hole 50j of the guide side plate 50b.

The second support shaft 63 protrudes axially outward from the other end of the movable body 60 in the axial direction. The second support shaft 63 is supported by the second support hole 52j of the frame side plate 52b.

The movable pin 64 has a columnar shape extending in the axial direction. For example, the material of the movable pin 64 is different from that of a cam 70. For example, when the cam 70 is formed of a resin material, the movable pin 64 is made of a metal material. This makes it possible to suppress wear of the movable pin 64 due to continuous use.

An axially inner end portion of the movable pin 64 is connected to the other end of the movable body 60. As a result, the other end portion of the movable pin 64 protrudes outward in the axial direction from the movable body 60. As shown in FIG. 5, the movable pin 64 is disposed near the proximal end of the transition guide 61.

The movable pin 64 is a drive transmission component for operating the movable guide 45. The movable pin 64 makes contact with the cam 70 so as to move the transition guide 61 forward and backward with respect to the through-hole 50h of the guide body 50a. Due to contact with the cam 70, the movable pin 64 causes the transition guide 61 to protrude outward from the through-hole 50h or retract toward the inside of the guide body 50a.

The urging receiving portion 65 protrudes inward in the radial direction of the movable body 60. The urging receiving portion 65 is provided in a central portion in the axial direction of the movable body 60. The urging receiving portion 65 extends along the inner periphery of the guide plate 50 from the connecting portion of the movable pin 64 when viewed from the axial direction. The urging receiving portion 65 receives the urging force of a spring 71 (that is an example of an urging member). As a result, the movable pin 64 is urged toward the inner peripheral surface (that is a cam surface 70f) of the cam 70 (see FIG. 4).

The drive mechanism 46 drives the movable guide 45. The drive mechanism 46 stores the transition guide 61 in the interior of the roller 42 except during sheet transition. As shown in FIG. 3, the drive mechanism 46 includes a cam 70 and a spring 71.

For example, the material of the cam 70 is different from that of the movable pin 64. For example, when the movable pin 64 is formed of a metal material, the cam 70 is formed of a resin material such as a POM resin (polyacetal resin) or a fluorine resin. Thereby, the slidability of the movable pin 64 with respect to the cam 70 can be improved (sliding friction can be reduced).

As shown in FIG. 4, the cam 70 includes a cam body 70a and a coupling portion 70b. The cam body 70a has an annular shape when viewed from the axial direction. The cam body 70a has a cam surface 70f on an inner periphery thereof. The cam surface 70f forms a movement trajectory of the movable pin 64. The cam surface 70f has a first surface 70f1 and a second surface 70f2.

The first surface 70f1 has an arc shape that is coaxial with the shaft 53 when viewed from the axial direction. The second surface 70f2 has a curved shape protruding outward in the radial direction from the first surface 70f1 when viewed from the axial direction. When the movable pin 64 is at the projecting end of the second surface 70f2, the amount of protrusion of the transition guide 61 from the through-hole 50h of the guide body 50a is maximized (see FIGS. 6A and 6B).

Figure 6A:
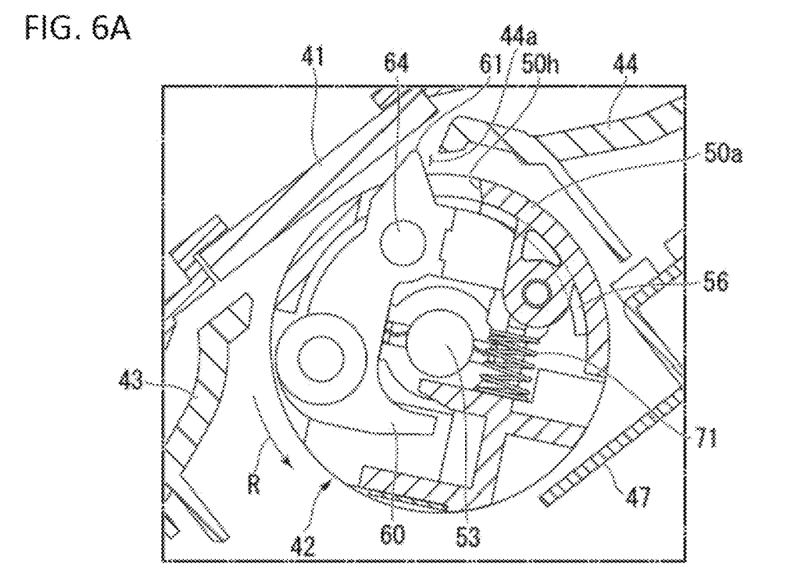
FIGS. 6A and 6B depict operations of a sheet conveying device in a cross-sectional view according to an embodiment.
Figure 6B:
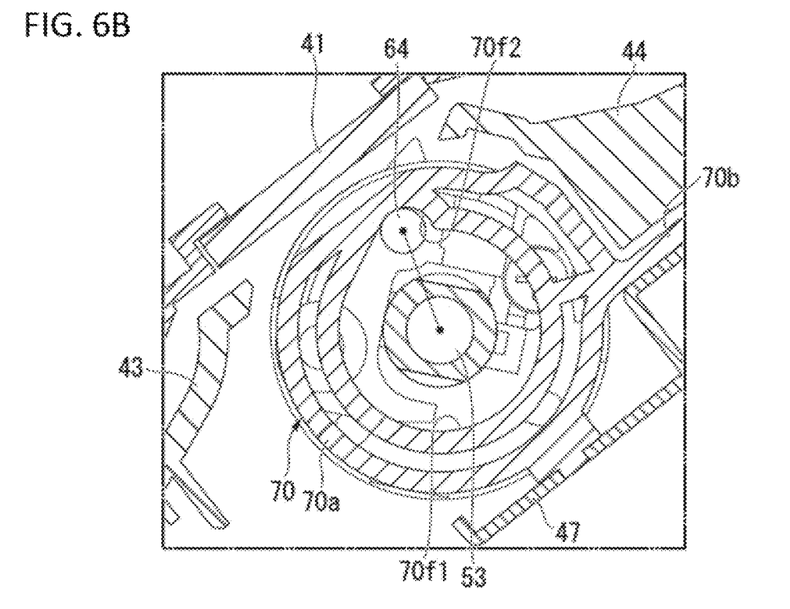
Figure 7A:
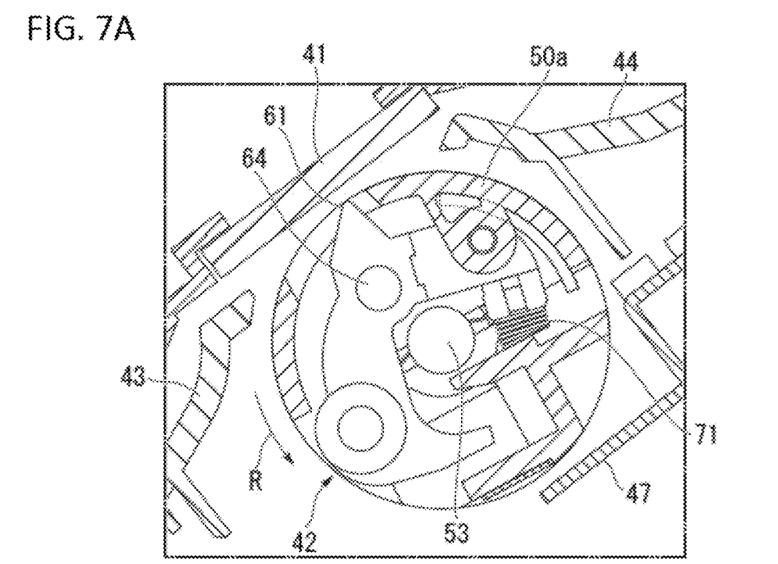
FIGS. 7A and 7B depict operations of a sheet conveying device in a cross-sectional view according to an embodiment. 7A
Figure 7B:
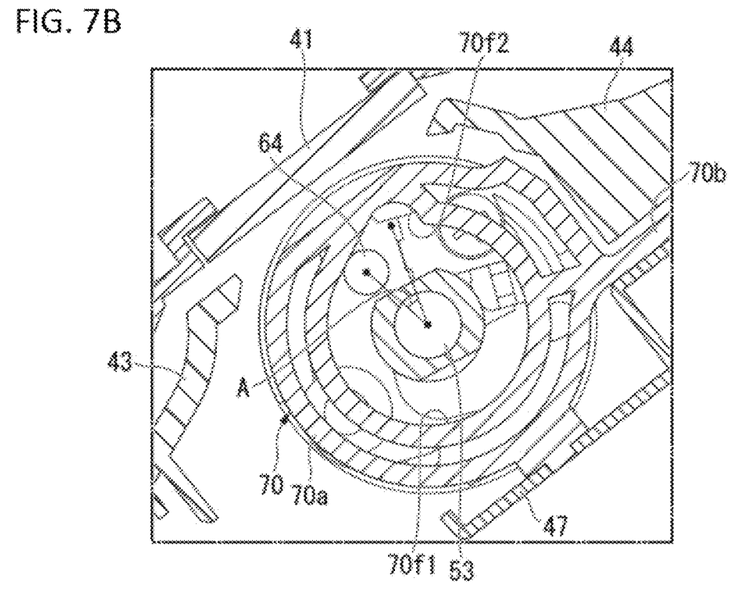
Figure 8A:
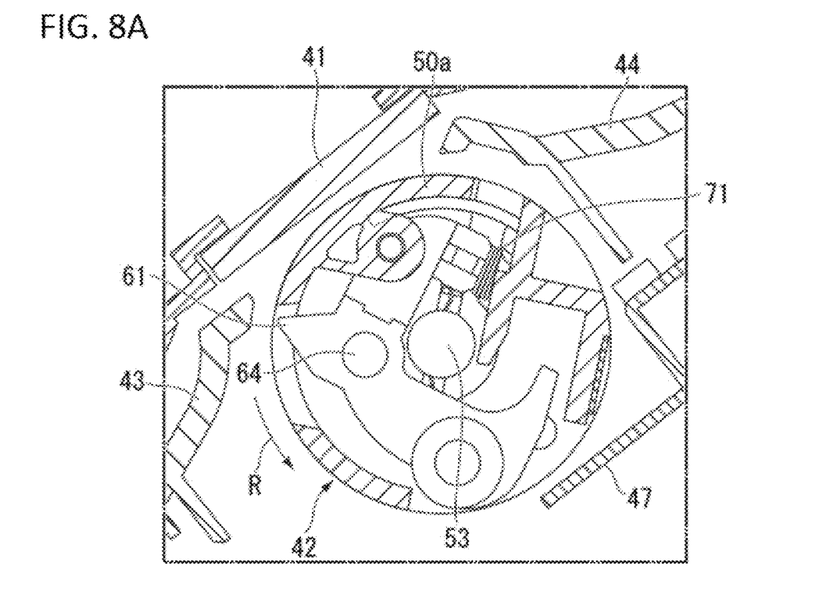
FIGS. 8A and 8B depict operations of a sheet conveying device in a cross-sectional view according to an embodiment.
Figure 8B:
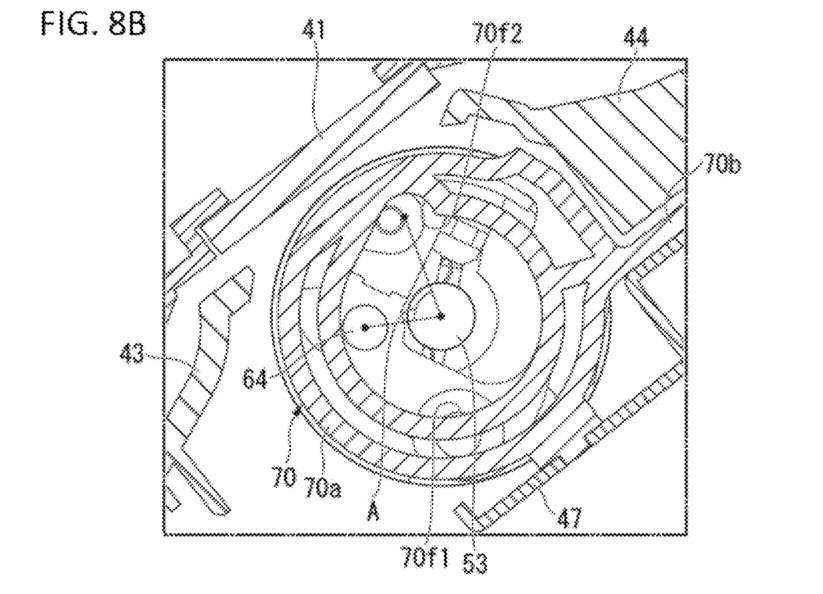

Here, a position at which the movable pin 64 is located at the protruding end of the second surface 70f2 is set as a reference position (see FIG. 6B). The reference position is a position at which a rotation angle of the movable pin 64 is 0°. rotation angle A is set with the counterclockwise direction shown in FIG. 6B. FIG. 7B illustrates a position where the rotation angle A of the movable pin 64 is 40°. FIG. 8B illustrates a position where the rotation angle A of the movable pin 64 is 80°. FIG. 9B illustrates a position where the rotation angle A of the movable pin 64 is 350°.

The first surface 70f1 is formed in an area in which the rotation angle A of the movable pin 64 is in a range of about 40° (FIG. 7B) to 350° (FIG. 9B) in the counterclockwise direction. The second surface 70f2 is formed in an area in which the rotation angle A of the movable pin 64 is in a range of 350° (FIG. 9B) to 40° (FIG. 7B) (that is, in a range of 0° to 40° and in a range of 350° to 360°) in the counterclockwise direction. In the range of 0° to 40°, connection portions of the first surface 70f1 and the second surface 70f2 are formed in a linear shape (when viewed from the axial direction). In the range of 350° to 360°, connection portions of the first surface 70f1 and the second surface 70f2 are bent (angled) when viewed from the axial direction.

As shown in FIG. 4, the coupling portion 70b protrudes radially outward from the outer periphery of the cam body 70a. For example, the coupling portion 70b is integrally formed of the same member as that of the cam body 70a. The coupling portion 70b is fixed to the chassis 47 (see FIG. 3) by a fastening member such as a bolt. The cam body 70a is fixed to the chassis 47 via a coupling portion 70b. Thereby, the cam 70 is placed in a fixed position.

As shown in FIG. 5, the spring 71 is disposed between the frame 52 and the movable guide 45. For example, the spring 71 is a compression spring. One end of the spring 71 is connected to the frame 52. The other end of the spring 71 is connected to the urging receiving portion 65 of the movable guide 45. The spring 71 constantly biases the movable guide 45 toward the outer side in the radial direction.

The operation of the transition guide 61 will be described in further detail below.

The transition guide 61 protrudes outward from the through-hole 50h of the guide body 50a during the sheet conveyance (see FIG. 6A). In this case, the movable pin 64 is disposed on the protruding end of the second surface 70f2 by the urging force of the spring 71 in the radial direction (see FIG. 6B).

Next, the roller 42 rotates in the direction of the arrow R in FIG. 6A (counterclockwise) from a state in which the movable pin 64 is located at the protruding end of the second surface 70f2. Then, the movable pin 64 moves from the second surface 70f2 toward the first surface 70f1 (see FIG. 7B). In the present embodiment, the connection portions of the first surface 70f1 and the second surface 70f2 in the range of 0° to 40° are formed in a linear shape when viewed from the axial direction. Therefore, the movable pin 64 smoothly moves from the second surface 70f2 toward the first surface 70f1. Accordingly, the transition guide 61 gently moves from a protruding state toward a retracted state.

When the movable pin 64 moves from the second surface 70f2 toward the first surface 70f1, the movable pin 64 is disposed on the first surface 70f1 against the urging force of the spring in the radial direction (see FIG. 7B). Therefore, the transition guide 61 is housed inside the roller 42 (see FIG. 7A). While the movable pin 64 is disposed on the first surface 70f1, the transition guide 61 remains housed inside the roller 42 (see FIG. 8A and FIG. 9A).

Figure 9A:
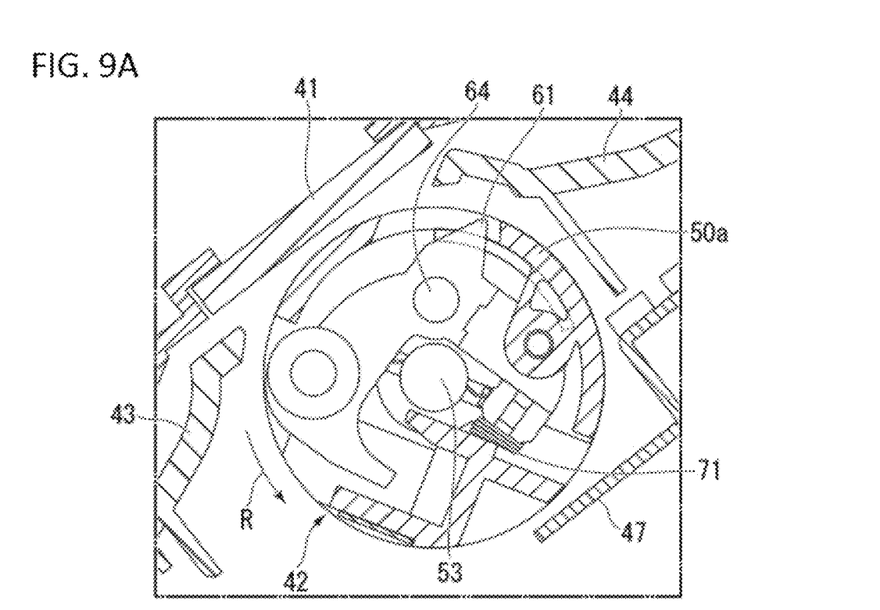
FIGS. 9A and 9B depict operations of a sheet conveying device in a cross-sectional view according to an embodiment.
Figure 9B:
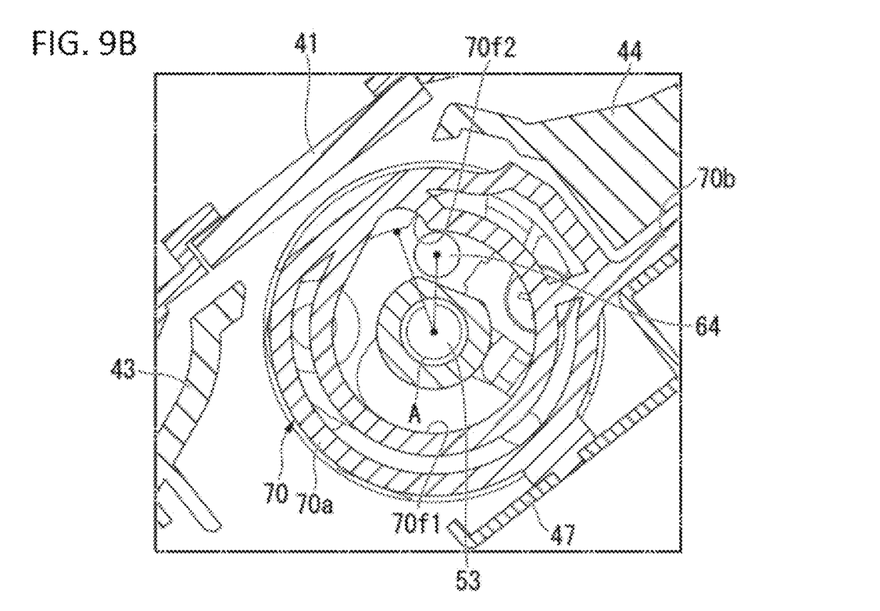

Next, the roller 42 rotates in the direction indicated by the arrow R in FIG. 9A from the state in which the movable pin 64 is located on the first surface 70f1. Then, the movable pin 64 moves from the first surface 70f1 toward the second surface 70f2 (see FIG. 6B). As a result, the movable pin 64 returns to the reference position. In the present embodiment, the connection portions of the first surface 70f1 and the second surface 70f2 in the range of 350° to 360° are bent when viewed from the axial direction. Therefore, the movable pin 64 rapidly moves from the first surface 70f1 toward the second surface 70f2. Accordingly, the transition guide 61 suddenly moves from the retracted state toward the protruded state.

The operation of the sheet conveying device 40 will be described in further detail below.

When reading the sheet in a DSDF, for example, the reading device 41 captures an image of the white correction plate 51 in order to determine a white reference of the CCD. Thereby, the white level of the CCD is adjusted. When the reading device 41 includes a plurality of CCDs, the individual difference of the white level of each CCD is adjusted to a reference value. In this case, the white correction plate 51 is located at a position facing the reading surface 41a.

The white level correction is performed, for example, when the image forming apparatus 1 is powered on, when the image forming apparatus 1 restarts from sleep-mode, and after jam processing is performed. The CPU 91 of the controller 6 (see FIG. 2) rotates the roller 42 so that the white correction plate 51 faces the reading surface 41a in accordance with the timing of the correction.

Next, when the sheet is conveyed after the correction, the roller 42 rotates to a position where the guide body 50a faces the reading surface 41a. During the sheet conveyance, the roller 42 stays at a fixed position. The movable pin 64 is disposed on the protruding end of the second surface 70f2 by the urging force of the spring 71 in the radial direction (see FIG. 6B). The leading end of the transition guide 61 protrudes outward from the through-hole 50h of the guide body 50a (see FIG. 6A). The transition guide 61 spans/blocks the gap 44a between the roller 42 and the upstream end of the downstream guide 44. The transition guide 61 serves as a temporary support for a document being conveyed in the sheet conveyance direction V. Accordingly, it is possible to prevent the leading end of the sheet S (that is the most downstream end of the sheet S along the sheet conveyance direction V) from being caught by the downstream guide 44 when the sheet S is being conveyed. Therefore, it is possible to suppress an occurrence of a corner folding of the sheet S, a jam of the sheet S, and the like.

Next, the roller 42 rotates in a state in which the transition guide 61 protrudes outward from the through-hole 50h of the guide body 50a. Then, the movable pin 64 moves from the second surface 70f2 toward the first surface 70f1. The movable pin 64 is disposed on the first surface 70f1 against the urging force of the spring 71 in the radial direction (see FIG. 7B). The transition guide 61 is housed inside the roller 42 (see FIG. 7A). Accordingly, it is possible to prevent the transition guide 61 from colliding with the peripheral components (for example, the reading device 41, the upstream guide 43, the downstream guide 44, the chassis 47, and the like) of the roller 42. Therefore, it is possible to suppress breakage of the peripheral parts of the roller 42 and generation of abnormal noise.

Next, the roller 42 rotates in a state where the transition guide 61 is housed inside the roller 42. Then, the movable pin 64 moves from the first surface 70f1 toward the second surface 70f2 (see FIG. 6B). Due to the biasing force of the spring 71 in the radially outward direction, the movable pin 64 rapidly moves toward the protruding end of the second surface 70f2. Since the cushion 56 is provided on the inner surface of the guide body 50a in the radial direction, the movable body 60 can suppress a direct collision with the guide body 50a (see FIG. 6A). Therefore, it is possible to suppress the generation of noise due to the collision of the movable body 60 with the guide body 50a.

In the present embodiment, the sheet conveying device 40 includes the reading device 41, the roller 42, the downstream guide 44, and the transition guide 61. The reading device 41 reads a surface of the sheet S. The roller 42 faces the reading device 41. The downstream guide 44 is downstream of the roller 42 in the sheet conveyance direction V. The transition guide 61 guides the sheet S after the leading end of the sheet S passes the reading position P until the sheet S passes the upstream end (that is, crosses the gap 44a) of the downstream guide 44.

The transition guide 61 guides the sheet S during a sheet transition time. This prevents the leading end of the sheet S (that is the most downstream end along the sheet conveyance direction V) from moving into the gap 44a between the roller 42 and the downstream guide 44 during sheet travel through the sheet conveying device 40. Therefore, the sheet S will not be caught or jammed while being conveyed in the sheet conveying device 40 of the document reading unit 11.

In the present embodiment, the sheet conveyance device 40 includes the drive mechanism 46 that stores the transition guide(s) 61 inside the roller 42 except during sheet transition time. This helps prevent a transition guide 61 from colliding with peripheral parts (for example, the reading device 41, the downstream guide 44, and the like) of the roller 42. Therefore, breakage of or damage to the peripheral parts of the roller 42 as well as generation of abnormal noise due to such collision can be effectively avoided.

In the present embodiment, the drive mechanism 46 comprises a cam 70 so that the operation (movement in and out at appropriate times) of a transition guide 61 can be realized by a relatively simple configuration.

In the present embodiment, the roller 42 also serves as a white reference plate so that a white reference can be determined based on the white reference place when reading one surface of the sheet S.

In the present embodiment, the roller 42 is disposed inside the roller 42 and includes the cushion 56 that suppresses an impact during operation of the transition guide 61. This suppresses generation of abnormal noise during the operation of the transition guide 61 by the cushion 56.

In the present embodiment, the roller 42 or the movable body thereof comprises the plurality of transition guides 61 provided in the axial direction of the roller 42. The plurality of transition guides 61 are disposed at positions corresponding to at least both ends of the sheet S in the width direction. This prevents the sheet S from bending at its ends (edges) in the width direction, thus it is possible to stably guide the sheet S within the sheet conveying device 40.

The document reading unit 11 comprises the sheet conveying device 40 according to the present embodiment. The sheet conveying device 40 is capable of preventing catching of the sheet S during the sheet conveyance. Therefore, the document reading unit 11 can smoothly convey the sheet S that has been read on both sides. Consequently, the image forming apparatus 1 that comprises the document reading unit 11 can suppress an occurrence of corner folding of the sheet S, a jam of the sheet S, and the like.

Next, some modified embodiments will be described.

Figure 10:
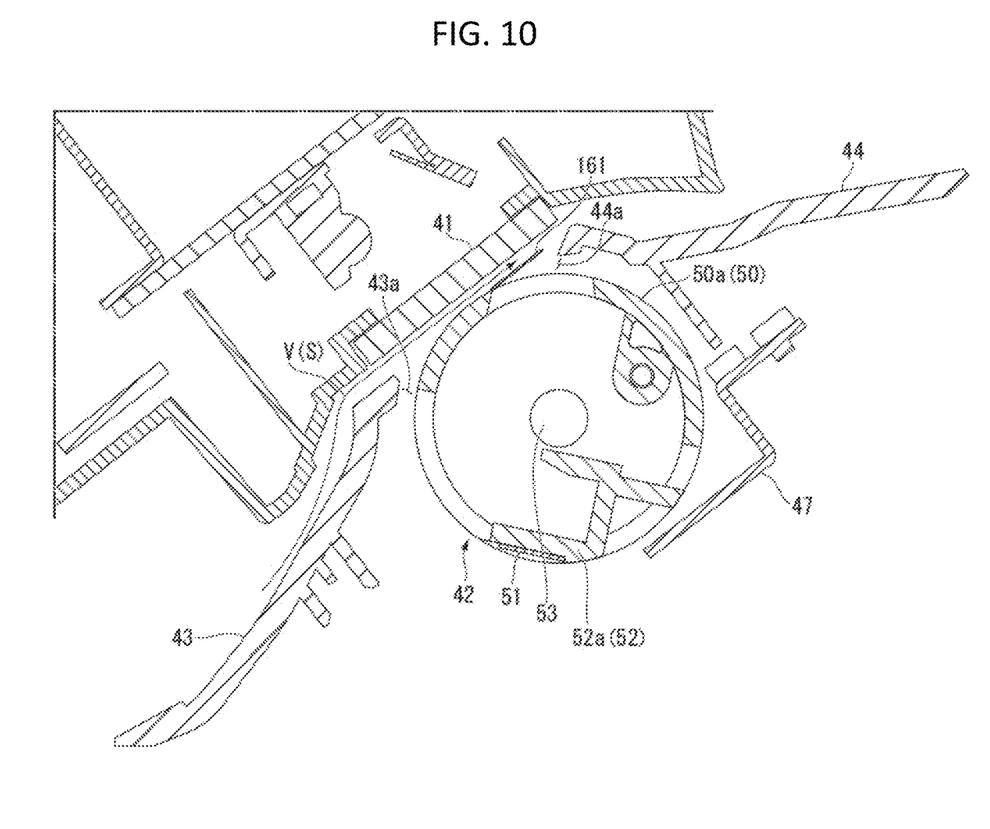
FIG. 10 depicts a sheet conveying device in a cross-sectional view according to a modified embodiment.

In one modified embodiment, as shown in FIG. 10, a transition guide 161 is provided on the guide plate 50, protruding from the guide body 50a toward the downstream side of the sheet conveyance direction V. In this example, the transition guide 161 may always protrude from the guide body 50a. The transition guide 161 may have a plate shape along the sheet conveyance direction V. The upstream end of the transition guide 161 in the sheet conveyance direction V may be coupled to the guide body 50a. The transition guide 161 is only needed to guide the sheet S during sheet transition, but may always be present/extended.

The sheet conveying apparatus device 40 of the first embodiment includes a drive mechanism 46 that stores the transition guide 61 in the interior of the roller 42 except for during sheet transition times. In one modified embodiment, the sheet conveying device 40 need not include a drive mechanism 46. Without the drive mechanism 46, the transition guide 61 may always protrude to the outside of the roller 42 rather than just during the sheet transition time. That is, the transition guide continuously protrudes, even during non-transition times.

In one modified embodiment, the drive mechanism 46 need not include the cam 70. Instead, for example, the drive mechanism 46 may comprise a switch such that the transition guide 61 may protrude out of the roller 42 by turning on of the switch. As another example, the sheet conveying device 40 may include a driving device (e.g., a solenoid) that drives the advancing and retracting operation of the transition guide 61. Furthermore, the transition guide 61 is not limited to a mechanical drive and may be controlled by an electromagnetic action.

In one modified embodiment, the roller 42 need not be configured to serve as a white reference plate. For example, the white reference plate may be provided separately from the roller 42.

The roller 42 of the first embodiment includes a cushion 56. In one modified embodiment, the roller 42 need not include the cushion 56. For example, the connection portions of the first surface 70f1 and the second surface 70f2 in the range of 350° to 360° may be formed in a linear shape when viewed from the axial direction.

A transition guide 61 of the first embodiment is provided in a plurality along the axial direction of the roller 42. The transition guides 61 are disposed on at least both edges/sides in the width direction of the sheet S. In one modified embodiment, only one transition guide 61 is be provided. For example, a transition guide 61 may be disposed in a central portion of the roller 42 along the axial direction. The number of the transition guides 61 may be set in accordance with required specifications or to achieve desired effects or functions.

In one modified embodiment, the roller 42 may rotate in a clockwise direction instead of a counterclockwise direction. The rotation direction of the roller 42 may be arbitrarily changed according to the shape of the cam surface 70f. The shape of the cam surface 70f may be determined in accordance with required specifications or to achieve desired effects.

In some embodiments, the image processing apparatus may be a decoloring apparatus. In this case, the fixing device 30 may be a decoloring apparatus. The decoloring apparatus performs a process of decoloring or erasing an image formed on the sheet in a decoloring toner.

In at least one embodiment, the transition guide 161 or the transition guide 61 guides the sheet S at least during the sheet transition time. Such a sheet guide or transition effectively prevents the leading end (that is the downstream end in the sheet conveyance direction V) of the sheet S from moving into the gap 44a between the roller 42 and the downstream guide 44. Therefore, the sheet S will not be caught or jammed while being conveyed in the sheet conveying device 40 or the document reading unit 11.

While certain embodiments have been described, these embodiments have been presented by way of example only and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed:

1. A sheet conveying device, comprising:
   a reading device configured to read an image from a surface of a sheet at a reading position;
   a roller facing the reading device such that the sheet passes between the reading device and the roller when the sheet is conveyed along a sheet conveyance direction;
   a downstream guide downstream of the roller along the sheet conveyance direction, a gap in the sheet conveyance direction being left between an upstream end of the downstream guide and the roller; and
   a transition guide to block the gap and guide a leading edge of the sheet in the sheet conveyance direction on to the downstream guide during a sheet transition from the roller to downstream guide.

2. The sheet conveying device according to claim 1, further comprising:
   a drive mechanism configured to extend the transition guide during the sheet transition and retract the transition guide into the roller otherwise.

3. The sheet conveying device according to claim 2, wherein the drive mechanism comprises a cam.

4. The sheet conveying device according to claim 1, wherein the roller includes a white reference plate to be used for determining a white reference level for reading the image from the surface of the sheet.

5. The sheet conveying device according to claim 1, wherein the roller comprises a plurality of transition guides spaced from each other in an axial direction of the roller.

6. The sheet conveying device according to claim 5, wherein the plurality of transition guides are at positions corresponding to standard sheet sizes.

7. The sheet conveying device according to claim 6, wherein transition guides of the plurality of transition guides are at the positions corresponding to both outer edges in a width direction of the standard size sheets.

8. The sheet conveying device according to claim 1, wherein the transition guide protrudes outward from the roller during the sheet transition.

9. The sheet conveying device according to claim 8, wherein the transition guide is attached to a cam.

10. The sheet conveying device according to claim 1, wherein
    the roller comprises a guide plate with a portion at the reading position, and
    the transition guide extends from the portion of the guide plate in the sheet conveyance towards the downstream guide.

11. The sheet conveying device according to claim 1, further comprising:
    a upstream guide upstream of the roller along the sheet conveyance direction.

12. The sheet conveying device according to claim 1, wherein the reading device comprises a plurality of charge-coupled devices arranged adjacent to one another along the axial length of the roller.

13. An image processing apparatus, comprising:
    a document reader configured to read an image from a surface of a sheet at a reading position; and
    a sheet conveying device configured to convey the sheet in a sheet conveyance direction past the document reader, the sheet conveying device comprising:
        a roller facing the reading device such that the sheet passes between the document reader and the roller when the sheet is conveyed by the sheet conveying device in the sheet conveyance direction;
        a downstream guide downstream of the roller along the sheet conveyance direction, a gap in the sheet conveyance direction being left between an upstream end of the downstream guide and the roller; and
        a transition guide to block the gap and guide a leading edge of the sheet in the sheet conveyance direction on to the downstream guide during a sheet transition from the roller to downstream guide.

14. The image processing apparatus according to claim 13, further comprising:
    a drive mechanism configured to extend the transition guide during the sheet transition and retract the transition guide into the roller otherwise.

15. The image processing apparatus according to claim 14, wherein the drive mechanism comprises a cam.

16. The image processing apparatus according to claim 13, wherein the roller is includes a white reference plate to be used for determining a white reference level for reading the image from the surface of the sheet.

17. The image processing apparatus according to claim 13, wherein the roller comprises a plurality of transition guides spaced from each other in an axial direction of the roller.

18. The image processing apparatus according to claim 13, wherein the transition guide is integrated with a cam.

19. The image processing apparatus according to claim 13, wherein the roller comprises a guide plate with a portion at the reading position, and the transition guide extends from the portion of the guide plate in the sheet conveyance towards the downstream guide.

20. An image processing device, comprising:

a reader configured to read a surface of a sheet at a reading position;

a roller facing the reader at the reading position;

a downstream guide downstream of the roller in a sheet conveyance direction; and a transition guide configured to protrude outward from the roller at least during a sheet transition between the roller and the downstream guide, the transition guide being configured to prevent the sheet from entering a gap between the roller and the downstream guide when the sheet travels in the sheet conveyance direction from the reading position to an upstream end of the downstream guide.

* * * * *